Jan. 28, 1969    R. A. SANFORD ET AL    3,424,975
APPARATUS WITH PARALLEL FLOW PATHS FOR MEASURING
ELECTRICAL CONDUCTIVITY OF FLUIDS
Filed Oct. 23, 1965

*INVENTORS*
R. A. SANFORD
F. D. McCRAY
THOMAS HUTSON, JR.
BY
*ATTORNEYS*

United States Patent Office 3,424,975
Patented Jan. 28, 1969

3,424,975
APPARATUS WITH PARALLEL FLOW PATHS FOR MEASURING ELECTRICAL CONDUCTIVITY OF FLUIDS
Richard A. Sanford, Floyd D. McCray, and Thomas Hutson, Jr., Bartlesville, Okla., assignors to Phillips Petroleum Company, a corporation of Delaware
Filed Oct. 23, 1965, Ser. No. 503,512
U.S. Cl. 324—30         2 Claims
Int. Cl. G01r 11/44

ABSTRACT OF THE DISCLOSURE

Electrical conductivity of flowing fluids is measured by apparatus which establishes parallel flow paths for the fluid. One flow path is through three conduits in series which are formed of electrically conductive material. Conduits of electrically insulating material extend from the central conductive conduit into the outer conductive conduits to provide elongated electrical paths between the central conductive conduit and the outer conductive conduits. A valve is provided in the second flow path to permit relative adjustment of flows through the two paths.

---

Electrical conductivity cells are commonly used in determining the conductivity of static or dynamic fluids. These cells are designed with two electrodes immersed in the fluid, the distance between said electrodes dependent upon the size of the cell and the conductivity of the specific fluid. The distance between these electrodes, and therefore, the current path between the electrodes, is in any case relatively short. For this reason the resistance of the fluid between the electrodes will be relatively small, especially if the fluid is a good conductor. Small variations in the conductivity of the electrode surface due to corrosion and erosion are therefore quite noticeable. The same is true for any other electrode effect. Since these small variations are noticeable, it is difficult to get an accurate measurement, especially when it is desirable to use conductivity measurements to determine changes in composition of a fluid when a small change in conductivity reflects a significant change in composition.

This invention provides a new and novel way to increase the length of the electrical path and therefore the resistance of a conductivity cell which can be placed in a conduit through which fluid continually flows. Small variations in the resistance due to electrode effects therefore become negligible and compositions can accurately be determined. This invention provides a way to force the current to follow a path of any desired length. In its simplest form, a suitable electrical insulating material which is chemically inert to the fluid is placed in tubular form within a metal conduit through which fluid flows. Halfway along the length of the insulating tube, an electrode is placed so that it does not contact the conduit but does contact the fluid flowing within the insulating tube. An electrical potential is then imposed between the electrode and the metal conduit, which can be at ground. The path the current must flow and, therefore, the resistance is thus defined by the length of the tubing, the cross-sectional area, and the conductivity of the fluid therein. The electrode is usually placed in the middle of the insulating tube because this position guarantees that the current will pass through the longest column of fluid, half the current going upstream and half the current going downstream until the metal contact is reached and the circuit is completed. If, however, the flow downstream is allowed to drip to the ground or in any other way does not make contact with some conductor, then the electrode can be placed very near the downstream end of the insulating tube. The conductivity or resistance of the fluid in the tube can be determined and recorded by utilizing the current flow directly or the resistance as one of the legs in a suitable balancing circuit.

An example of the use of this invention in one preferred form described below, will illustrate some of its advantages. A length of ⅛ inch plastic tubing about 20 feet in length was placed in a conduit carrying highly conductive and corrosive hydrofluoric acid. It was desirable to know the amount of water in the hydrofluoric acid at all times; but at the same time, it was necessary to keep the fluid contained due to its extreme corrosiveness. An electrical potential was imposed between the metal conduit and an electrode disposed at the midpoint of the length of tubing. When nearly anhydrous hydrofluoric acid was passed through the conduit, the resistance was found to be about 600,000 ohms. However, when 4 weight percent water was placed in solution with the acid, the resistance was found to be about 10,000 ohms. The cell when calibrated gave an accurate reading of the water concentration of the solution.

The foregoing example is to be taken as illustrative only and not as limiting the invention.

An object of this invention is to provide an improved system of apparatus to measure the conductivity of a fluid passing through a conduit. Since the current path through the fluid from one electrode to the other can be easily lengthened, the resistance of the cell can thus be that which is desired for any particular use of the cell.

Another object of this invention is to allow the conductivity of the fluid passing through the conduit to be measured while the flow through the conduit is not interrupted.

Another object of this invention is to provide instantaneous determination of the conductivity of the fluid by measuring the current between the electrode or by utilizing the resistance as one of the legs of a balancing circuit.

Another object of this invention is to provide an operable system of apparatus to determine the conductivity of a conductive fluid in order to determine the composition of said fluid.

Other objects and advantages of this invention will become apparent to those skilled in the art upon reference to the accompanying specifications, claims, and drawings in which:

Figure 1:
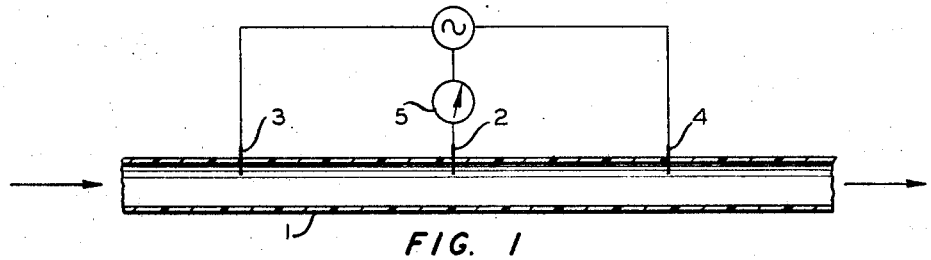
FIGURE 1 is a longitudinal view of the invention in its simplest form.

FIGURE 1 illustrates the invention in its simplest form. Conduit 1 is of a nonconductive material, such as a plastic resin. Electrode 2 is placed through conduit 1 at its midpoint so that it is immersed in the fluid flowing through conduit 1. Electrodes 3 and 4 are placed equidistant from electrode 2 so that when an electrical potential is placed across electrodes 2 and 3 and across electrodes 2 and 4, current will flow from electrode 2 in parallel paths to electrodes 3 and 4. If a suitable meter 5 is placed in the circuit, the conductivity of the fluid then flowing through conduit 1 may be read.

Figure 2:
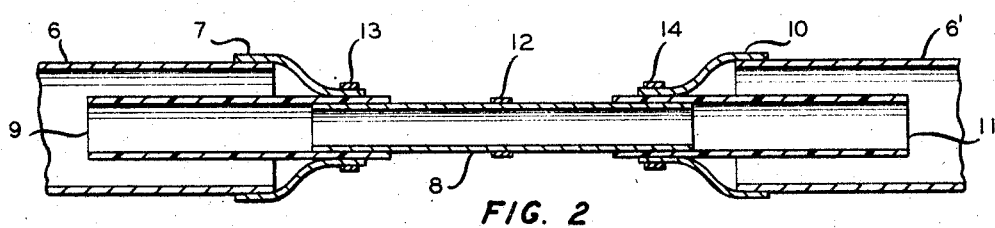
FIGURE 2 is a longitudinal view of a second embodiment of the conductivity cell.

FIGURE 2 illustrates another embodiment of the invention. Conduit 6 is made of steel or other suitable material for containing the pressure of the system. Reducing coupling 7 is attached to conduit 6 in any suitable manner. Coupling 7 is affixed to electrode tube 8, made of any suitable conductor which will contain the fluid pressure, with an electrical insulating material 9 between in such a manner that coupling 7 and electrode tube 8 are not in physical contact and a liquid tight pressure seal is obtained. The insulating material may be flexible material in a tubular form which is chemically inert to the fluid. Such insulating tube is firmly affixed at one end between coupling 7 and electrode tube 8. The remaining portion of the insulating tube is free in the conduit so that the fluid passing through the conduit passes through the insulating tube and therefore through the electrode tube. In the same manner above described, reducing coupling 10 and insulating tube 11 are affixed to the opposite end of the electrode tube, and coupling 10 is connected to conduit 6'. An external electrical connection 12 is provided on the central section of the exposed electrode tube. Other external electrical connections 13 and 14 are provided on couplings 7 and 10. By placing an electrical potential between connections 12 and 13 and connections 12 and 14, current flows in parallel paths from electrode tube 8 through the fluid in the insulating tubes until contact with the conduits is made. The conductivity of the fluid can be determined by measuring the current or by utilizing the resistance of the parallel fluid paths as a leg in a balancing circuit.

Figure 3:
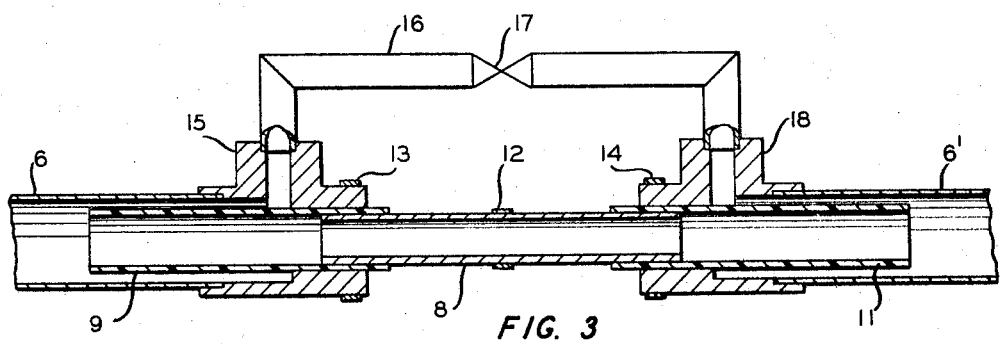
FIGURE 3 is a longitudinal view of a third embodiment of the conductivity cell.

FIGURE 3 represents a third embodiment of the invention. In this embodiment conduit 6 is connected in any suitable manner to one through leg of T-fitting 15. Bypass conduit 16 is connected to the normal leg of T-fitting 15. Bypass conduit 16 is attached to a valving means 17 which allows part of the flow in the primary conduit 6 to bypass the conductivity cell. The other through leg of T-fitting 15 is affixed to electrode tube 8 with insulating tube 9 between in such a manner as to keep the electrode tube from physical contact with said T-fitting and to make a liquid tight pressure seal. One end of insulating tube 9 is firmly affixed between the through leg of T-fitting 15 and the electrode tube while the other portion of said insulating tube remains free in the primary conduit in such a manner that at least a portion of the fluid flowing in the primary conduit flows through the insulating tube and therefore through the electrode tube. If the flow in the primary conduit is relatively high it may be necessary to allow a portion of this flow to bypass the insulating tube and electrode tube. This is done by opening valve 17 in the by-pass conduit, therefore allowing a portion of said flow to bypass the conductivity cell. The bypass is also useful to allow flushing of the annulus between the primary conduit and the insulating tube. The bypass conduit also serves the function of supporting the conductivity cell since the only seal between the T-fitting and the electrode tube is the insulating material which tends to extrude if too much force is applied. In the same manner above described, electrode tube 8 is affixed to T-fitting 18 to which the by-pass conduit and conduit 6' are also attached. External electrical connections 12, 13, and 14 are provided on the middle portion of the electrode tube and the T-fittings in the same way as described for FIGURE 2. By imposing an electrical potential between external connections 12 and 13 and connections 12 and 14 the conductivity of the fluid in the insulating tubes can be determined. It should be noted that the insulating tube can be any desired length. If a long conductivity path is desired, the tube can be coiled within the main flow pipe to increase the conductivity path without requiring an excessively long cell structure.

It must be noted that either one of the above two embodiments can be placed in a side draw conduit instead of a process conduit.

The circuit utilized to convert the conductivity to a knowledgeable response of a meter or a reactor can be any such circuit known to those skilled in the art which is convenient for the use intended.

The conductivity of the fluid being tested can be measured in terms of the resistance of the fluid paths between the electrodes. The fluid path "resistances" can be connected in bridge networks, for example, to make such measurements. The conductivity cells of this invention can be placed in chambers that are maintained at constant temperatures to provide more accurate measurements. Also, temperature compensating elements can be added to the measuring circuits.

While this invention has been illustrated and described in detail to enable one skilled in the art to make and use the same, it must be noted that the illustrated embodiments are merely exemplary.

What is claimed is:

1. Electrical conductivity measuring apparatus comprising first and second conduits of electrically conductive material axially aligned and spaced from one another; a third conduit of electrically conductive material axially aligned with and positioned between said first and second conduits; a fourth conduit of electrically insulating material secured at one end to said third conduit and extending therefrom into said first conduit, said fourth conduit being of smaller diameter than said first conduit so that a first annular space is formed between said first and fourth conduits; a fifth conduit of electrically insulating material secured at one end to said third conduit and extending therefrom into said second conduit, said fifth conduit being of smaller diameter than said second conduit so that a second annular space is formed between said second and fifth conduits; a sixth conduit connected at one end to said first annular space and at the other end to said second annular space to provide a first fluid path between said first and second conduits in parallel with a second fluid path between said first and second conduits through said fourth, third, and fifth conduits; and first, second and third electrodes electrically connected to said first, second and third conduits, respectively.

2. The apparatus of claim 1, further comprising a valve in said sixth conduit to permit adjustment of relative fluid flows through said first and second flow paths.

References Cited

UNITED STATES PATENTS

| 2,230,593 | 2/1941 | Hassler | 324—30 X |
| 2,258,045 | 10/1941 | Christie | 324—30 |
| 2,482,078 | 9/1949 | Wallace | 324—30 X |
| 2,654,067 | 9/1953 | Bruce | 324—61 |
| 2,696,737 | 12/1954 | Mittelmann | 73—194 |
| 2,712,111 | 6/1955 | Farison | 324—30 |
| 2,798,215 | 7/1957 | Domingo et al. | |
| 2,851,654 | 9/1958 | Haddad | 324—30 |
| 2,922,103 | 1/1960 | Smith | 324—10 X |
| 3,003,103 | 10/1961 | Smals et al. | 324—30 |
| 3,242,729 | 3/1966 | Keller | 324—30 X |

RUDOLPH V. ROLINEC, *Primary Examiner.*

C. F. ROBERTS, *Assistant Examiner.*